United States Patent [19]

Kotani

[11] Patent Number: 4,566,543
[45] Date of Patent: Jan. 28, 1986

[54] AERATOR CARRIED BY AUTOMOTIVE VEHICLE AND CONTROL SYSTEM THEREFOR

[75] Inventor: Masutoshi Kotani, Osaka, Japan

[73] Assignee: Iwatani & Co., Ltd., Japan

[21] Appl. No.: 521,932

[22] Filed: Aug. 10, 1983

[51] Int. Cl.[4] .................... A01B 45/02; A01B 63/114; A01C 23/02

[52] U.S. Cl. ........................... 172/4; 111/6; 172/21; 172/98; 172/117; 405/269

[58] Field of Search ............... 172/2, 4, 12, 21, 22, 172/465, 98, 117; 111/6, 7.1, 7.2, 7.3, 7.4; 405/269

[56] References Cited

U.S. PATENT DOCUMENTS

| | | | |
|---|---|---|---|
| 2,302,944 | 11/1942 | Helbig | 172/21 |
| 2,789,522 | 4/1957 | Barton | 172/21 X |
| 3,029,756 | 4/1962 | Krivda | 111/6 |
| 3,450,073 | 6/1969 | Baker | 111/6 |
| 3,546,886 | 12/1970 | Jones et al. | 111/7.1 X |
| 3,608,318 | 9/1971 | Levy et al. | 405/269 X |
| 4,069,774 | 1/1978 | Lofgren et al. | 172/4 X |

Primary Examiner—Richard T. Stouffer
Attorney, Agent, or Firm—Bacon & Thomas

[57] ABSTRACT

An automotive aerator includes a tractor or the like and an aerator carried movable vertically by the tractor or the like. A landing sensor for the detection of the spike pipe of the aerator, a device for driving the spike pipe into soil, and a depth sensor for detecting that the spike pipe has been driven to a predetermined depth in soil are provided so that actuation of the spike pipe driving device is preferably started when the spike pipe engages the surface of the ground and is stopped when the spike pipe reaches the predetermined depth.

4 Claims, 7 Drawing Figures

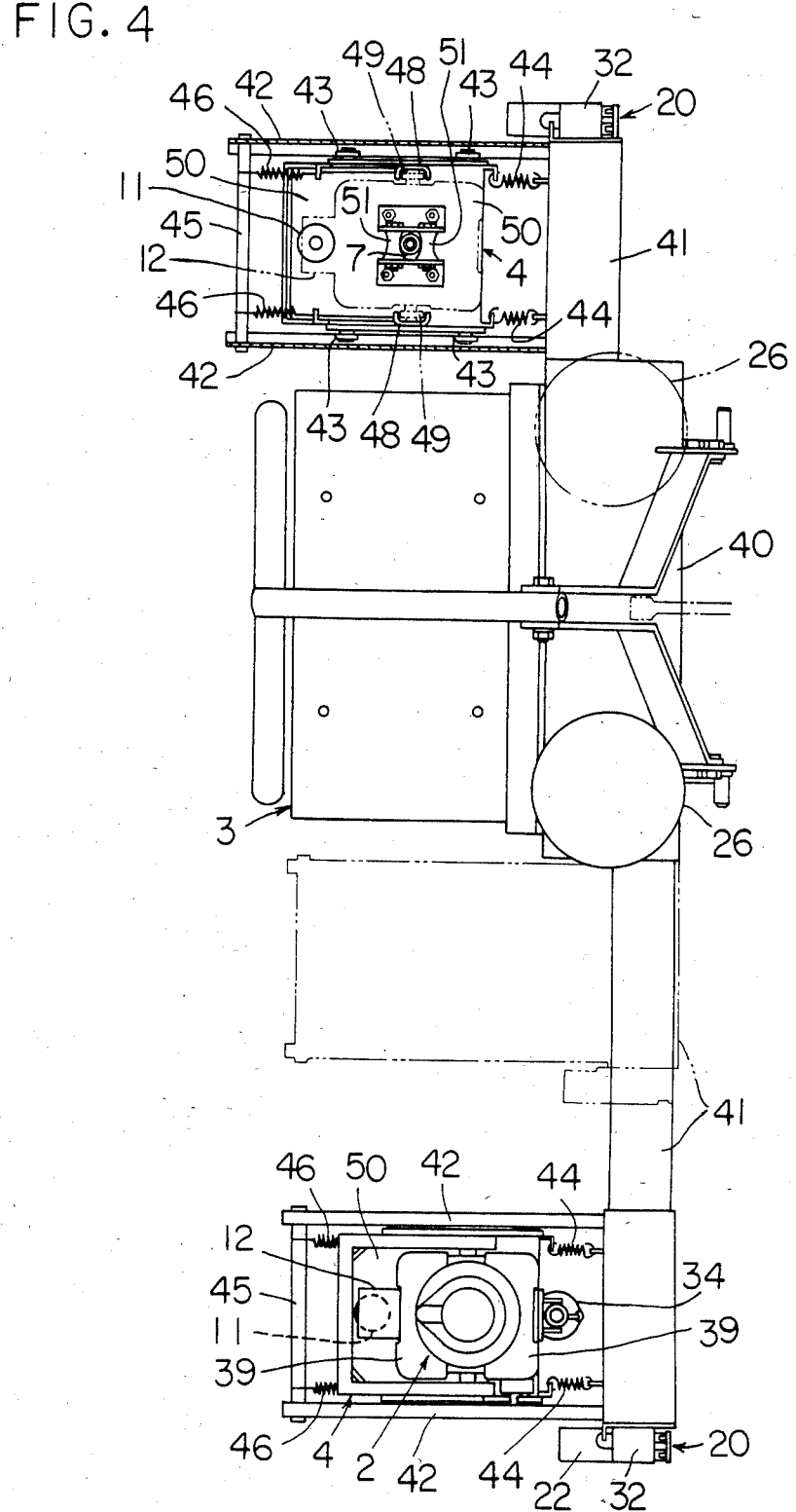

AERATOR CARRIED BY AUTOMOTIVE VEHICLE AND CONTROL SYSTEM THEREFOR

FIELD OF THE INVENTION

The present invention relates generally to an automotive aerator and more particularly to the one which involves an aerator mounted vertically movable on a farm tractor by means of an holding frame.

BACKGROUND OF THE INVENTION

In large farms it is known to be a common trouble that the soil is compacted by the treads of large farming machines or deteriorated through abuse of chemical fertilizers, the result being deterioration of quality and/or yield of crops.

For improvement of such compacted or deteriorated soil there is known a method in which pores are created in the soil by explosive blasting of air therein through a spike pipe driven in to proper depths. For this new made of ploughing an automotive aerator is used, this being a farm tractor or the like equipped with an aerator or the above-mentioned spike pipe.

Hitherto, ploughing with such an automotive aerator has been made in the following way.

The operator drives a tractor or the like to bring the aerator to where air ploughing is required. There he lower the aerator to a proper height above the ground, and then start a spiking means for driving in the spike pipe to a proper depth in the soil and then, after stopping the spiking means, compressed air is let explosively out into the soil through the spike pipe and nozzle holes at the tip thereof. In this conventional manner, the operator judges with his skill whether the height of the holding frame or aerator, the depth of the spike pipe under the ground are proper. Therefore, the spike pipe is not accurately driven into the soil by the predetermined depth. Consequently, the ploughing is not even locally, and the state of the crop is not so good as expected.

And it was not seldom that the tractor is moved before the spike pipe had been drawn out of the ground. In such case, the spiking pipe is bent or broken off.

In some case, more than two spike pipes are equipped on one tractor for the improvement of aeration efficiency. In such cases it is desirable to make the distance between the individual spike pipes adjustable for proper aeration to be made according to the planting interval of fruit trees, ridge width, soil hardness, degree of soil deterioration etc.

SUMMARY OF THE INVENTION

According to the present invention which has been made to solve the above-mentioned problems, the spike pipe can be driven to a proper depth in the soil when a single starting command has been input after bringing it to the desired position, and is thus aimed at improving and levelling the yield.

In order to attain this object, the present invention covers a spiking means and a control system. The control system comprises a "start" commanding device, which the operator uses to give the "start" command, and an aeration depth detector for detection that the spike pipe is down to the predetermined depth in the soil, and the present invention is characterized in that the spiking means is started by the "start" command output from the "start" commanding device, and the spiking means is stopped when the reach of the spike pipe to be predetermined depth is detected by the depth detector.

In applying the present invention, it is advisable to so arrange that when aeration is over and the "end" command is given by the operator, the spike pipe is drawn out and lifted to a predetermined height above the ground automatically so that there is no risk of the tip of the spike pipe touching the ground during the subsequent traveling.

In order to meet these requirements, it is so adapted according to the present invention that an extracting means is provided for pulling the spike pipe up to the predetermined "high" position above the ground, the above-mentioned control system further comprises an "end" commanding device, which the operator uses to give the "end" command, and a pulling sensor which detects pulling of the spike pipe to the predetermined "high" position above the ground, and the extracting means is started after the output of "end" command by the "end" commanding device of the control system to bring the spike pipe to the predetermined "high" position.

Preferably, the tractor may be provided with an holding frame movable longitudinally, this holding frame carrying the aerator movable vertically, and a safety spring pulling the holding frame forward and a counter spring biasing the same rearward may be disposed between the tractor and the holding frame so that, if the tractor should start with the spike pipe in the soil, the safety spring is broken for the tractor to start leaving the aerator staying there. The present invention will be better understood by reference to the following detailed description of the preferred embodiments illustrated in the accompanying drawings.

BRIEF DESCRIPTION OF THE DRAWINGS

In the accompanying drawings:

FIG. 4 is a fragmentary plan view thereof;

DETAILED DESCRIPTION OF THE PREFERRED EMBODIMENTS

Figure 1:
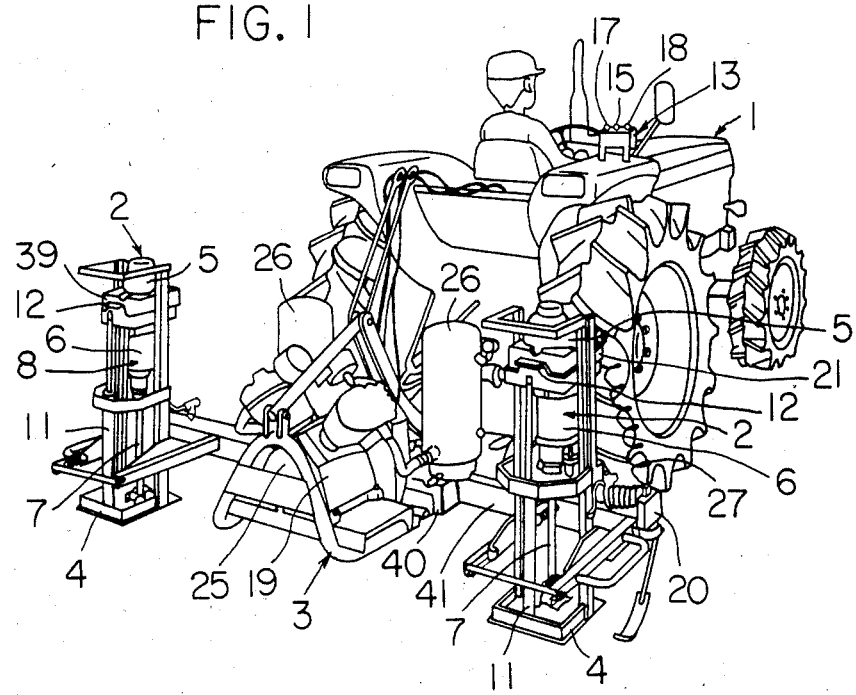
FIG. 1 is a perspective view of an embodiment of the present invention.

An automotive aerator shown in FIGS. 1 through 6 comprises a tractor 1 and aerators 2 carried thereby in the following way.

Behind the tractor 1 there is provided a lifting frame 3 swingable vertically and this lifting frame 3 is connected with holding frames 4 on both sides thereof. The aerator 2 is carried by each holding frame 4.

Figure 2:
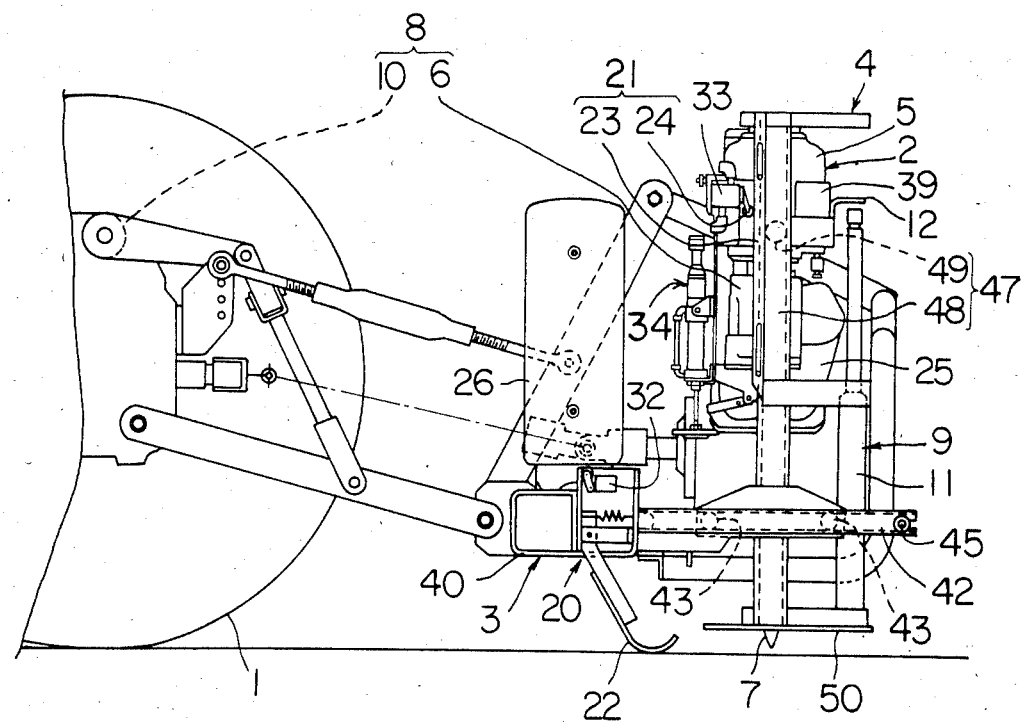
FIG. 2 is a fragmentary side view thereof.
Figure 3:
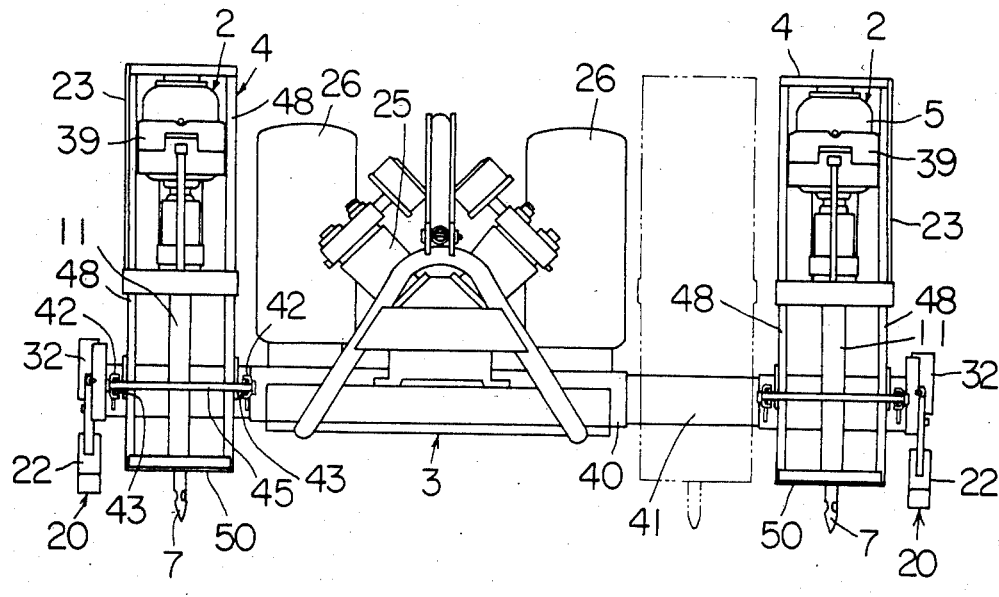
FIG. 3 is a fragmentary rear view thereof.
Figure 5:
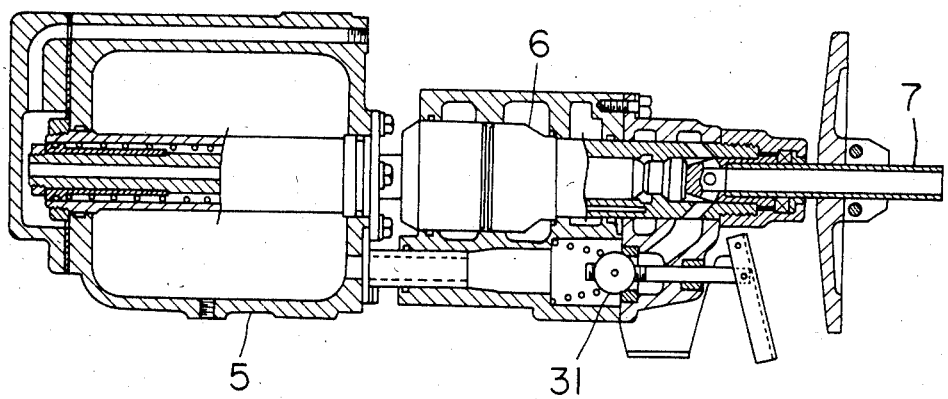
FIG. 5 is a vertical sectional view of an aerator.

As shown in FIGS. 2 through 4, the aerator 2 comprises an accumulator 5 and a vertical air hammer 6, which has a spike pipe 7 attached to its lower end.

The spike pipe 7 of the aerator 2 carried by the tractor 1 is driven into the soil by a spiking means 8.

After aeration at the predetermined depth in the soil the spike pipe 7 is pulled up by a extracting means 9 to a predetermined height above the ground.

The spiking means 8 comprises a hydraulic actuator 10 of the tractor 1 provided for vertically lowering the lifting frame into ground contact and the air hammer 6 of the aerator 2 for driving the spike pipe into the soil once it has come into ground contact.

The extracting means 9, on the other hand, comprises an air cylinder 11 provided erect on each mounting frame 4 and the hydraulic actuator 10. The lifting frame 3 is lifted to the predetermined height by the hydraulic actuator 10 and at the same time the spike pipe 7 of the aerator 2 is pulled out of the soil by pushing up the bracket 12 projecting in front of the accumulator 5 by means of the air cylinder 11 and brought up to the predetermined height. The operation of the spiking means and extracting means is controlled by the control system 13.

The control system 13 comprises a "start" commanding device 15 accessible from the driver's seat 14 of the tractor 1, an aeration depth detector 16 for detection that the spike pipe 7 is down to the predetermined depth in the soil, an "end" commanding device 17 consisting of a push button accessible from driver's seat of the tractor 1, an aeration control switch 18 consisting of another push button at the driver's seat 14 of the tractor 1 and a compressed air source 19. The aforesaid aeration depth detector 16 comprises a frame height detector 20 for detection that the lifting frame 3 is down to the predetermined height above the ground and a spiking depth detector 21 disposed between the holding frame 4 and the aerator 2.

The frame height detector 20 comprises a frame height sensor 22 including lifting levers pivoted on both lateral ends of the lifting frame 3, and the spiking depth detector 21 comprises a cam 23 for setting the spiking depth and a spiking depth sensor 24 including a lever spring-biased to be in contact with the cam face.

Figure 6:
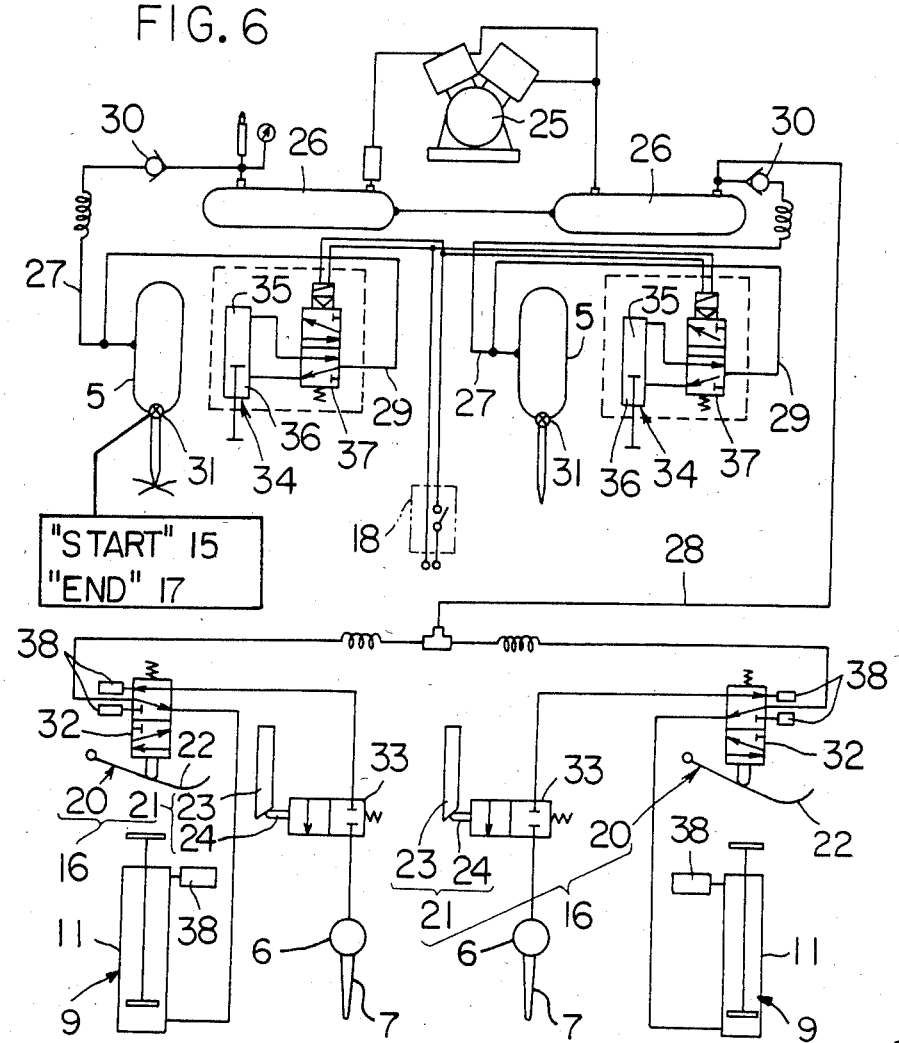
FIG. 6 is a block diagram showing its pneumatic and electric circuits.

As shown in FIG. 6, the compressed air source 19 comprises an air compressor 25, a pair of air tanks 26, an air supply channel 27 connecting each air tank 26 with the accumulator 5 of each aerator 2, an air channel for driving 28 connecting each air tank 26 with the air hammer 6 and extracting means 9 and an air path for controlling aeration 29 branched from the air supply channel 27.

The air supply channel 27 is provided with a check valve 30 for preventing back flow to the air tank 26 so as to keep the accumulator 5 free from influences of pressure reduction resulting from operation of the air hammer 6. By this arrangement aeration during operation of the air hammer 6 is enabled to facilitate driving of the spike pipe 7 into the soil as well as opening the aeration control valve 31 of the accumulator 5 for aeration or air ploughing without waiting for restoration to the predetermined level of the pressure in the air tank 26 after driving the spike pipe 7 to the predetermined depth The air channel for driving 28 is provided with a switching control valve 32 for selectively switching for supply of compressed air to the air hammer 6 with simultaneous discharging of air from the extracting means 9 or for supply of compressed air to the extracting means 9, and also with a normally closed shut-off valve 33 (of the auto-reversible shut-off valve) between the switching controlling valve 32 and the air hammer 6.

The switching control valve 32 and the shut-off valve 33 are subject to mechanical switching action, the former in accordance with the detection of the frame height by the frame height detector 20 and the latter with the detection of the depth of spike pipe by the spiking depth detector 21 respectively.

The air path for controlling aeration 29 is provided with an air cylinder 34 of double acting type for opening/closing the aeration control valve 31 and a solenoid directional switching valve 37 for switching supply of compressed air to the air chambers 35/36 of the air cylinder 34.

In FIG. 6 silencers are represented by reference numeral 38. In FIG. 2 reference numeral 39 designates weights, which are fixed on the periphery of the accumulator 5.

The compressor 25 and air tank 26 are mounted on the lifting frame 3 in the laterally central section 40, and to this central section 40 there are connected left and right telescopic arms 41. Each aerator 2 is held at the other end of each telescopic arm 41. Thus, the distance between the left and right aerators 2 is properly adjustable thereby.

Each telescopic arm 41 has a pair of longitudinally long rails 42 extending rearward. The holding frames 4 are carried by these rails 42 via rollers 43 to be longitudinally slidable. Safety springs 44 pulling the holding frame 4 forward are provided between each telescopic arm 41 and each holding frame 4. A counter bar 45 is engaged with the pair of rails 42 to be disengageable from behind, and between this counter bar 45 and the holding frame 4 are provided counter springs 46 for the safety springs 44. By this arrangement the aerator 2 is allowed to be displaced longitudinally when its spike pipe 7 has hit a stone on the surface of or in the soil so that the spike pipe 7 can be driven deeper dodging the stone and also, if the tractor 1 should be started with the spike pipe 7 of the aerator 2 inserted in the soil, the safety spring 44 is broken for the aerator 2 and holding frame 4 to be left behind safe as the tractor 1 departs.

A lifting guide means 47 for guiding the aerator 2 as it is lifted or lowered comprises guide rails 48 which also serve as longitudinal members of the holding frame 4, guide rollers 49 adapted to roll freely thereon and a pair of spike pipe guide rollers 51 rotatably carried on the footing plate 50 of the holding frame 4.

That the holding frame 4 is provided with a flat footing or bottom plate 50 is advantageous for preventing slanting of the aerator 2 or its sinking when the ground is soft or weak.

The automotive aerator of the above-described setup is to be operated by the operator as follows.

First the tractor is driven to the desired place in a farm or the like with the lifting frame 3 and the aerator 2 lifted, the latter to its "high" position, to be parked there. Then the button of the "start" commanding device 15 is pressed to shift it from the OFF position to the COMMAND position for the "start" command to be issued.

Upon issuance the "start" command, the hydraulic actuator 10 of the tractor 1 is extended and the lifting frame 3 is lowered to the predetermined height above the ground with the holding frame 4 in contact with the ground as well as the lower end of the spike pipe 7. When the lifting frame 3 has been lowered to this level, frame height sensor 22 of the frame height detector 20 is swung up. Thus, the frame height detector 20 detects that the lifting frame 3 has come down to the predetermined height above the ground. Upon actuation of this frame height sensor 22 the switching control valve 32 of the control system 13 is switched to the side for connection with the air hammer 6 and the air hammer 6 starts driving the spike pipe 7 into the soil.

Even if it is so arranged that the extension of the hydraulic actuator 10 is automatically stopped upon actuation of the frame height sensor 22 with the above-mentioned function, it is also possible for the operator to recognize the starting of the air hammer 6 regardless of the actuation of the frame height sensor 22 and stop it manually by moving the button of the "start" commanding device 15 to the OFF position. Anyway, neither the holding frame 4 nor the lifting frame 3 can be lowered any more when the former has come into contact with the ground. When upon actuation of the frame height sensor 22 with the above-mentioned function the switching control valve 32 has been switched to the side for connection with the air hammer 6, the air cylinder 11 of the extracting means 9 communicates with atmosphere via the switching control valve 32; hence, the aerator 2 can come down freely as the spike pipe 7 is driven deeper into the soil.

When the spike pipe 7 has been driven to the predetermined depth, the sensor 24 of the spiking depth detector 21 is shifted from the OFF (non-detected) position to the ON (detected) position to indicate that the spike pipe 7 has been driven to the predetermined depth, and upon detection of this condition thereby the shut-off valve 33 of the control system 13 then open is automatically restored the closed position.

The operator may press the aeration control switch 18 at any time to shift the solenoid directional switching valve 37 of the air path for controlling aeration 29 from the closed to the open position to thereby use the compressed air in the accumulator 5 for aeration in the soil.

The operator, after having finished aeration with the aeration control valve 31 at the outlet of the accumulator 5 opened by pressing the "start" commanding device (button) 15, can issue "end" command by pressing the "end" commanding device (button) 17 and upon issuance of this "end" command the extracting means 9 is started by means of the control system 13 and the spike pipe 7 is lifted to the "high" position above the ground.

The tractor 1 is then moved to the next place for aeration and the above-mentioned series of steps is repeated.

It may as well be so arranged that the detection by the spiking depth detector 21 is cancelled simultaneously with pressing of the "end" commanding device (button) 17, but in this embodiment it is so arranged that the detection by the spiking depth detector 21 is automatically cancelled while the spike pipe 7 rises relative to the holding frame 4 with the air cylinder 11 of the extracting means 9 in operation.

In the above-described embodiment the aerator is carried by a tractor via the lifting frame and holding frame, but it is as well possible to omit the lifting frame and have the aerator directly carried on the tractor to be movable vertically. In such a case, the aerator naturally has no frame height detector, provided only with the spiking depth detector.

Alternatively, it is possible to male-thread the surface of the spike pipe rotatably connected with the accumulator, and provide an air motor, hydraulic motor, electric motor or the like for rotating the spike pipe instead of the air hammer of the above-described spiking means for screwing the spike pipe into the soil.

Although in the above embodiment the frame height sensor and spiking depth sensor of the aeration depth detector of the control system are made controllable by direct mechanical switching of the switching control valve and shut-off valve, it is also possible to use solenoid valves as these switching control valve and shut-off valve so that these valves can be switched by the electric signals output by the frame height sensor or the spiking depth sensor with its detecting function.

Figure 7:
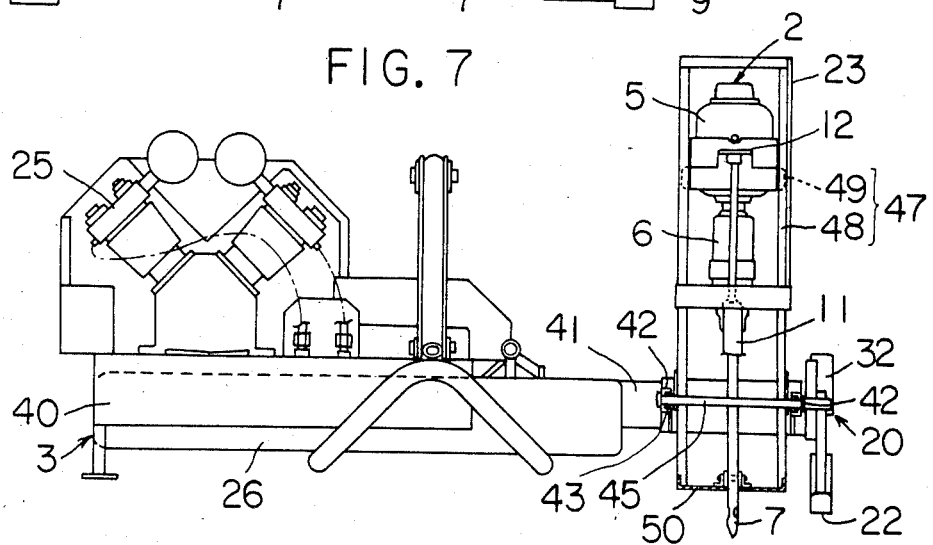
FIG. 7 is a fragmentary rear view of another embodiment of the present invention.

The embodiment shown in FIG. 7 is characterized in that the aerator 2, holding frame 4, frame height sensor 22 etc. are all provided only one unit each, and its setup is essentially the same as that of the embodiment shown in FIGS. 1 through 6 save for the revisions required therefor, that is, for the numerical difference.

What is claimed is:

1. An aerator which is carried by an automotive vehicle, and movable vertically, which aerator comprises:
   (a) a spike pipe;
   (b) a spiking means for driving the spike pipe from a "high" position above the ground into the soil said spiking means including an air hammer means for driving the spike pipe into the ground after the spiking means has lowered the spike pipe into ground contact;
   (c) an extraction means for pulling the spike pipe out of the soil to a predetermined height above the ground; and
   (d) a control system including:
       i. a "start" commanding device for sending a "start" command for actuating the spiking means,
       ii. an aeration depth detector for detecting when the spike pipe has been driven a predetermined depth into the soil and for stopping the actuation of the spiking means upon such detection,
       iii. an "end" commanding device for sending an "end" command for actuating the extraction means to pull the spike pipe out of the soil to a predetermined height above the ground,
       iv. a compressed air source including an air compressor, an air tank connected with the air compressor, an accumulator, an air supply channel connecting the air tank with the accumulator, and an air channel connecting the air tank with the air hammer means and the extraction means, and
       v. a check valve disposed in the air supply channel for preventing backflow of air to the air tank.

2. An aerator which is carried by an automotive vehicle, and movable vertically, which aerator comprises:
   (a) a spike pipe;
   (b) a spiking means for driving the spike pipe from a "high" position above the ground into the soil;
   (c) a control system including a "start" commanding device for sending a "start" command for actuating the spiking means;
   (d) an aeration depth detector for detecting when the spike pipe has been driven a predetermined depth into the soil and for stopping the actuation of the spiking means upon such detection;
   (e) a lifting frame extensible and retractable along the width of the automotive vehicle, the lifting frame including an intermediate frame and a pair of telescopic arms extensible and retractable along the width of the automotive vehicle and securable in a fixed position therealong, the telescopic arms being individually adjustable; and
   (f) the spike pipe being supported by one of said telescopic arms for lateral shifting with respect to the automotive vehicle while being capable of vertical movement with respect to the automotive vehicle by said spiking means.

3. An aerator which is carried by an automotive vehicle, and movable vertically, which aerator comprises:
 (a) a spike pipe;
 (b) a spiking means for driving the spike pipe from a "high" position above the ground into the soil;
 (c) a control system including a "start" commanding device for sending a "start" command for actuating the spiking means;
 (d) an aeration depth detector for detecting when the spike pipe has been driven a predetermined depth into the soil and for stopping the actuation of the spiking means upon such detection;
 (e) a holding frame connected to the automotive vehicle for longitudinal movement, the aerator being mounted on the holding frame, tension springs and countersprings carried by the holding frame for, respectively, pulling the holding frame in a forward direction and biasing the holding frame in a rearward direction.

4. An automotive aerator as recited in any of claims 1, 2 or 3, wherein the control system further includes a height sensor for sensing the engagement of the ground by the spike pipe and enabling the actuation of the spiking means.

* * * * *